US006470057B1

(12) United States Patent
Hui et al.

(10) Patent No.: US 6,470,057 B1
(45) Date of Patent: Oct. 22, 2002

(54) METHOD FOR TIMING RECOVERY AND COMPENSATION IN TIME-DIVISION-DUPLEX WIRELESS COMMUNICATIONS

(75) Inventors: Liu Hui, Issaquah, WA (US); Guanghan Xu, Austin, TX (US); Ping Liu, Austin, TX (US)

(73) Assignee: Cwill Telecommunications, Inc., Richardson, TX (US)

( * ) Notice: Subject to any disclaimer, the term of this patent is extended or adjusted under 35 U.S.C. 154(b) by 0 days.

(21) Appl. No.: 09/169,273

(22) Filed: Oct. 9, 1998

(51) Int. Cl.[7] .................................................. H01L 5/14
(52) U.S. Cl. ....................... 375/294; 370/350; 370/516; 375/356; 375/358
(58) Field of Search ................... 370/350, 516–519, 370/294; 375/356, 358

(56) References Cited

U.S. PATENT DOCUMENTS

| 4,841,544 | A | | 6/1989 | Nuytkens |
| 4,901,307 | A | | 2/1990 | Gilhousen et al. |
| 5,103,459 | A | | 4/1992 | Gilhousen et al. |
| 5,260,967 | A | | 11/1993 | Schilling |
| 5,329,546 | A | | 7/1994 | Lee |
| 5,359,624 | A | | 10/1994 | Lee et al. |
| 5,375,140 | A | | 12/1994 | Bustamante et al. |
| 5,410,568 | A | * | 4/1995 | Schilling |
| 5,477,195 | A | | 12/1995 | Spilker |
| 5,896,425 | A | * | 4/1999 | Hirano |
| 6,243,372 | B1 | * | 6/2001 | Petch |

OTHER PUBLICATIONS

John G. Proakis, Ph.D., P.E., Digital Communications. Third Edition, Chapter 6, Carrier and Symbol Synchronization, Mar. 1995, pp. 359–366.

* cited by examiner

Primary Examiner—Melvin Marcelo
Assistant Examiner—Inder Pal Mehra
(74) Attorney, Agent, or Firm—Jeffrey C. Hood (57) ABSTRACT

In a synchronous code division multiple access (SCDMA) time division duplex (TDD) communication system, a remote terminal uses both open loop and closed loop techniques for synchronization with a base station. The timing of reception of information by tile remote terminal is performed with an open loop technique, while the timing of transmissions from the terminal is performed with a closed loop technique. Furthermore, a clock locked loop in the terminal compensates for differences between clocks of the terminal and the base station. The clock locked loop responds to signals from both the aforesaid open loop and closed loop techniques.

20 Claims, 5 Drawing Sheets

METHOD FOR TIMING RECOVERY AND COMPENSATION IN TIME-DIVISION-DUPLEX WIRELESS COMMUNICATIONS

FIELD OF THE INVENTION

This invention relates in general to the field of communication systems, and more particularly to synchronization in a wireless system involving a base station and a plurality of mobile or fixed terminals.

BACKGROUND OF THE INVENTION

In TDD (time-division-duplex) transmit and receive frames are time multiplexed. Each pair of transmit and receive frames comprises a pre-reception period, a reception period, a pre-transmission period, and a transmission period (see FIG. 2). The base station has a fixed frame structure while all terminals adjust their pre-reception and pre-transmission periods and, consequently, the receive and transmit timing for synchronization. For the synchronous FDD (frequency-division-duplex) schemes, the transmit and receive frames happen to be in different frequency bands, where each receive frame comprises a pre-reception period and a reception period and each transmit frame comprises a pre-transmit period and a transmit period.

Reception (downlink) synchronization at the terminal is generally easy to maintain. Each terminal simply adjusts its pre-reception period based on downlink synchronization signals received to determine the starting point of demodulation. In other words, the terminal determines the time from the currently received downlink synchronization signal and the terminal extends or shortens the pre-reception time to anticipate the reception of subsequent downlink synchronization signals in the subsequent frames.

Transmission (uplink) synchronization, on the other hand, requires assistance from the base station. In some applications, e.g., synchronous code-division-multiple-access (S-CDMA) communications, it is essential that signals from all terminals arrive at the base station at the same time. The uplink (from the terminal to the base station) synchronization can only be accomplished using closed-loop control, i.e., feedback signals from the base station. Thus, for transmission synchronization in prior art systems, the base station provides feedback signals to the terminal which indicate the forward timing offset. The terminal uses the received forward timing offset feedback signals to adjust its pre-transmission time accordingly.

The two principal factors that cause timing offset in a wireless system are (i) propagation delays and (ii) the clock offset between the terminal and the base station. In prior art systems, feedback signals indicating a forward offset are used to compensate for both forward propagation delays and the clock offset. As a result, prior art forward synchronization approaches often have difficulties in the presence of large environmental variations. The prime reason is the lack of open loop timing adjustment or self tuning. More specifically, it would be desirable for a terminal to actively adjust its timing by incorporating information other than the forward delay offset provided by the base station.

Therefore, an improved system and method is desired for timing compensation and synchronization in TDD wireless communications.

BRIEF SUMMARY OF THE INVENTION

The present invention comprises an improved system and method for timing recovery and compensation in a synchronous wireless communication system. In the preferred embodiment, we focus on a TDD (time division duplex) S-CDMA system, where digital signals communicated between a terminal and a base station are received and transmitted in TDD frames. Each (TDD) frame comprises a pre-reception time with duration $T_{PR}$, a reception time with duration $T_R$, a pre-transmission time with duration $T_{PT}$, and a transmission time with duration $T_T$.

The two principal factors that cause the timing offset in a wireless system are (i) propagation delays and (ii) the clock offset between the terminal and the base station Due to propagation delays and the inherent clock frequency difference between the terminal and the base station, it is necessary to adjust the pre-reception and pre-transmission periods at the terminal periodically to maintain transmission and reception synchronization. The present invention provides an improved method for adjusting the pre-reception and pre-transmission times to maintain synchronization using both open loop and closed loop control techniques.

Different timing adjustment mechanisms are discussed below for three different modes of communications, namely, the monitor mode, the access mode, and the communication mode.

During the monitor mode, a terminal only receives the downlink signals broadcast from the base station without transmitting uplink signals. Briefly, in accordance with the present invention, the terminal utilizes received downlink synchronization signals to calculate the clock offset between the base station and the terminal, and actively adjusts the pre-reception time to accomplish frame synchronization. This can be done by applying the an accumulation of downlink delta signals to a local digital clock-locked-loop (CLL) to fine tune the default value of a counter that determine the duration of the pre-reception time, and hence gradually eliminates the timing difference due to clock offsets between the base station and the terminal.

During the access mode, a terminal transmits a signal to the base station, the base station receives the signal and sends a feedback signal comprising an access delta signal $\delta t_f$. The terminal then adjusts its pre-transmission time and pre-reception time accordingly. This delay represented by the access delta signal is caused mainly by the propagation delay or distance between the terminal and the base station.

After the access mode the terminal enters the communication mode in which the terminal and the base station exchange message information regularly. In every TDD frame, the terminal receives downlink signals from the base station during the pre-reception and the reception times. From the received downlink signals, the terminal first determines a downlink delta signal value, $\delta t_b$. The terminal compensates by adjusting the pre-reception period, using the downlink delta signal value. According to the present invention, the terminal adjusts the pre-transmission time using the complement of the downlink delta signal value so that the transmission timing remains unchanged.

The signals transmitted by the base station to the terminal include feedback signals to the terminal to adjust this timing of the uplink transmission. The receiver demodulates downlink signals and extracts the uplink delta signals, $\delta t_f$, therefrom. The terminal responds to the command and adjusts its pre-transmit timing. The uplink signals are also applied to a local digital clock-locked-loop (CLL) to fine tune the system clock of the terminal during the communication mode.

Therefore, in contrast to prior art approaches which achieve transmission synchronization based merely on feedback signals from the base station, the present invention incorporates knowledge of the propagation delays obtained during the access mode to significantly enhance the efficiency and reliability of timing control. During the communication mode, the present invention uses closed loop timing synchronization to compensate substantially only for the remaining timing offset due to clock differences. This is in contrast to prior art Systems which use closed loop timing synchronization, i.e., feedback from the base station, to compensate both for forward propagation delays and clock differences. Since the closed loop timing synchronization is not required to compensate for both the forward propagation delay and the clock difference, but rather only for the clock difference, the present invention provides improved timing synchronization.

Thus, the present invention uses both open loop and closed-loop timing control for more efficient and reliable synchronization. Open loop timing adjustments are used to compensate for propagation delays, thus enabling closed loop timing adjustments to be reserved substantially exclusively for clock offset differences. The prior art does not teach or suggest a method that combines open loop and closed loop synchronization mechanisms to cope with timing offset duo to propagation delays and clock offset. The present invention thus has the advantage of improved robustness against hardware imperfection and drastic environmental variations. The self-adaptive timing adjustment mechanism allows the use of lower cost, low precision oscillators at the terminals, leading to a considerably reduction in system cost. The present invention thus has the advantage of an improved high efficiency synchronization scheme in a TDD system.

BRIEF DESCRIPTION OF THE DRAWINGS

The features and advantages of the present invention will become more apparent from the detailed description set forth below when taken in conjunction with the drawings in which reference characters correspond throughout and wherein.

DETAILED DESCRIPTION

Incorporation by Reference

U.S. Pat. No. 5,329,546 to Lee dated Jul. 7, 1994 is hereby incorporated by reference as though fully and completely set forth herein.

Figure 1:
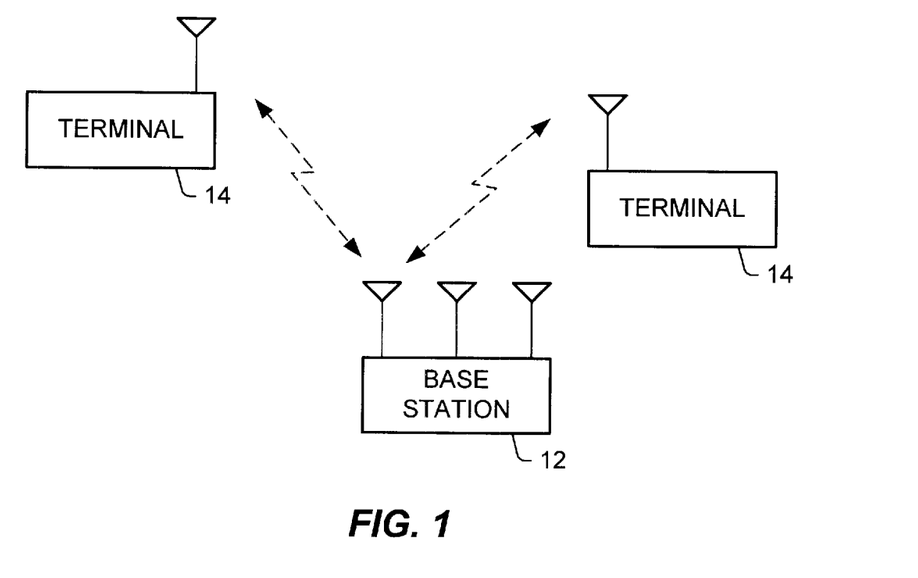
FIG. 1 illustrates a Time Division Duplex (TDD) communications system for communicating message data to and from a plurality of terminals.

FIG. 1 illustrates a Time Division Duplex (TDD) communications system for communicating message data to and from a plurality of terminals. In the preferred embodiment, the communication system uses an antenna array Synchronous Code Division Multiple Access (S-CDMA) communication system. As shown, the system comprises a base station 12 and a plurality of terminals 14. One or more of the terminals 14 include timing synchronization logic according to the preferred embodiment of the invention.

Figure 2:
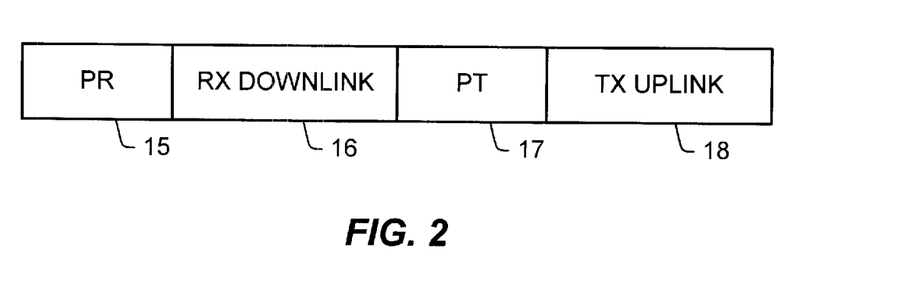
FIG. 2 shows a time-division-duplexing (TDD) frame adapted for transmitting and receiving data.

FIG. 2 shows a time-division-duplexing (TDD) frame adapted for transmitting and receiving data, meaning uplink transmission (TX) and downlink reception (RX) are performed at separate times. Each TDD frame preferably comprises a pre-reception time, 15, with duration $T_{PR}$, a reception time, 16, with duration $T_R$, a pre-transmission time, 17, with duration $T_{PT}$, and a transmission time, 18, with duration $T_T$. At the terminal, the duration of each time is controlled by a counter driven by the system clock. To accomplish synchronization between the terminal and the base station, the counter values within the terminal need to be adjusted periodically based on downlink and uplink timing factors.

The two principal factors that cause the timing offset in a wireless system are (i) propagation delays and (ii) the clock offset between the terminal and the base station. Due to propagation delays and the inherent clock difference between the terminal and the base station, it is necessary to adjust the pre-reception and pre-transmission periods at the terminal periodically to maintain transmission and reception synchronization. The present invention provides an improved method for adjusting the pre-reception and pre-transmission periods to maintain synchronization using both open loop and closed loop control.

Both the terminal 14 and the base station 12 utilize tho same frame structure, except the actual order of transmission and reception is switched. Regardless of conditions, the frame structure at the base station 12 is fixed and serves as a reference for the terminal 14. On the other hand, PR and PT at the terminal 14 must be adjusted continuously to accommodate environmental variations.

Figure 3:
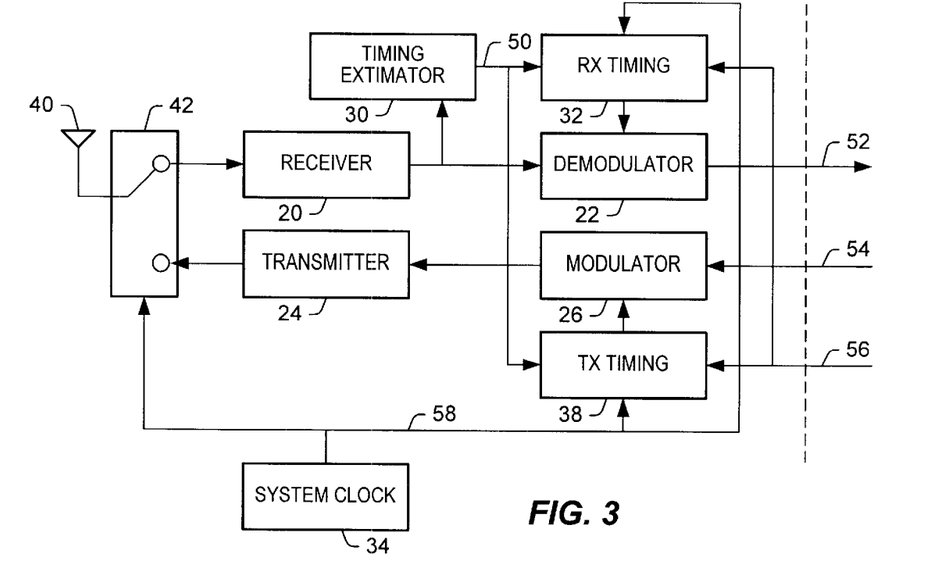
FIG. 3 illustrates a block diagram of an embodiment of a time-division-duplexing (TDD) mobile communication system with downlink and uplink timing adjustment modules.

FIG. 3 illustrates a block diagram of an embodiment of a time-division-duplexing (TDD) mobile communication system with downlink and uplink timing adjustment modules. FIG. 3 illustrates a block diagram or a terminal 14 of FIG. 1.

The terminal 14 includes an antenna 40 which is used for transmitting and receiving signals modulated with a carrier frequency. The antenna 40 is coupled to a switch 42 which selectably connects the antenna 40 to a receiver 20 or a transmitter 24. When the receiver 20 is connected to the antenna, the receiver 20 downconverts the received signals to baseband and performs analog-to-digital conversion to produce digital received signals When the transmitter 24 is connected to the antenna, the transmitter 24 performs digital-to-analog conversion and upconverts the transmit signals from baseband to RF to produce analog transmit signals.

The receiver 20 provides its output to a demodulator 22, which demodulates information from the received signals and provides an output 52. The receiver 20 also provides its output to a timing estimator 30. The timing estimator 30 provides a downlink propagation delay estimate 50, referred to as $\delta t_b$, to each of an RX timing module 32 and a TX timing module 38, The demodulator 22 receives a timing signal from the RX timing module 32. In the reverse manner, the system includes a modulator 26 which receives information or symbols 54. The modulator 26 provides its output to the transmitter 24. The modulator 26 receives a timing signal from the TX timing module 38. The terminal includes a system clock 34 which provides a system clock output 58 to each of the RX timing module 32 and the TX timing module 38. An uplink timing delay estimate 56, referred to as δt$_p$, is provided to each of the TX timing module 38 and the RX timing module 32.

As noted above, because of the propagation delay and the inevitable difference between the system clocks at the terminal 14 and the base station 12, the uplink (from the terminal to the base station) and downlink (from the base station to the terminal) timing needs to be adjust periodically during communication operations. Thus, in the preferred embodiment of the invention, the digital received signals received by the receiver 20 are provided to the timing estimator 30. The timing estimator 30 operates to determine the downlink delta signal 50 from the digital received signals. The timing estimator 30 determines the downlink delta signal 50 based on the difference in time from when tile downlink synchronization signals expected and actual arrival Limes. The downlink delta signal 50 is provided to the RX or downlink timing module 32. According to the present invention, the downlink delta signal 50 is also provided to the TX or forward timing module 38.

Therefore, during the RX time, the switch 42 connects the antenna 40 to the receiver 20. The receiver 20 receives the digital received signals and provides the signals to the demodulator 22 As noted above, the digital received signals received by the receiver 20 are also provided to the timing estimator 30, which operates to determine a downlink delta signal 50 from the digital received signals. The downlink delta signal δt$_b$ 50 is provided to each of the RX timing module 32 and the TX timing module 38. The RX timing module 32 controls the starting point for the demodulator 22. More particularly, the RX timing module 32 uses the downlink delta signal 50 to provide a proper timing signal to the demodulator 22 to compensate for the propagation delay in transmission of the downlink signals. The terminal 14 preferably adjusts the pre-reception period, using the downlink delay signal 50. The demodulated messages 52 are passed along to a central controller. As discussed below, the demodulated messages 52 also contain feedback signals comprising an uplink delta signal 56, provided by the base station 12, which is used for timing adjustment during the transmission frame.

A transmission frame starts upon the completion of a reception frame. During the transmission frame, the switch 42 connects the antenna 40 to the transmitter 24. Forward (transmitting) messages 54 are first modulated by the modulator 26. The TX timing module 38 coupled to the modulator 26 determines the actual transmit time during the transmission frame. As discussed above, the TX timing module 38 receives inputs comprising the uplink shift signal 56, downlink delta signal 50, and the system clock signal 58. The modulator 26 provides an output to the transmitter 24 which pulse shapes, if necessary, and upconverts the modulated signals to the carrier frequency to be transmitted from the antenna 40. According to the present invention, the TX timing module 38 uses the forward delay estimate 56 to compensate for the forward propagation delay.

In the preferred embodiment, the uplink delta signal 56 and the downlink delta signal 50 are also applied to fine tune the pre-reception period at the terminal, thus compensate the clock offset between the terminal and the base station. In the preferred embodiment, the clock-locked-loop (CLL) mechanism is utilized in the RX timing module 32 and the TX timing module 38 to tune the pre-reception periods based on a plurality of downlink delta signal 50 and uplink delta signals 56. The disclosed method thus gradually eliminates the clock difference between the base station 12 and the terminal 14.

Contrasting to prior art approaches which achieve transmission synchronization based solely on feedback signals from the base station, the present invention advantageously incorporates knowledge of the uplink delta signal and the downlink delta signal to compensate the clock offset and propagation delays as well, thus provide improved timing synchronization.

Figure 4:
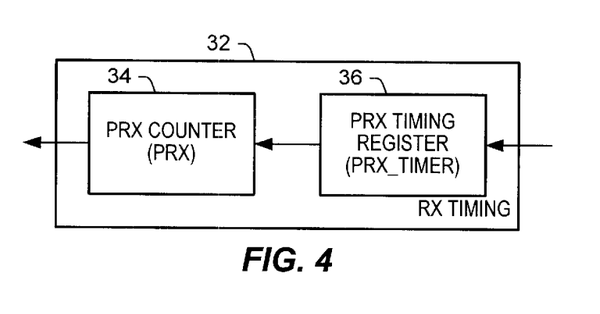
FIG. 4 illustrates a preferred embodiment of the RX timing module.

FIG. 4 illustrates a preferred embodiment of the RX timing module. In the RX timing module 32, a timing register 36 stores a numerical value, PRX_TIMER, corresponding to the duration of the pre-reception period. The PRX_TIMER provides a default value for a counter that controls the duration of the pre-reception period. At the beginning of each frame, a pre-reception counter 36 fetches PRX_TIMER from the timing register 36 and passes it to PRX as its initial value. The pre-reception starts as the PRX counter counts down from PRX and stops when PRX reaches zero. The same procedure repeats in every frame. Both PRX_TIMER and PRX can be re-set during the operations. However, changing PRX_TIMER affects the during of the pre-reception period permanently whereas changing the PRX value only affects the duration of the pre-reception period of the current frame.

Figure 5:
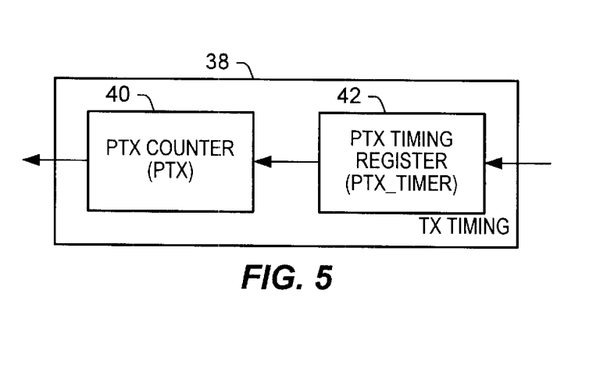
FIG. 5 illustrates a preferred embodiment of the TX timing module.

FIG. 5 illustrates a preferred embodiment of the TX timing module. FIG. 5 illustrates the TX timing module 38, which is comprised of a TX timing register 42 and a PTX counter 40. At the beginning of the pre-transmission period the PTX counter 40 fetches a initial or default value, PTX_TIMER, from the TX timing register 42 and assigns it to PTX. The pre-transmission period starts with the countdown of PTX at this initial value and the pre-transmission period ends when PTX reaches zero. The same procedure repeats in every frame. For the same reasons discussed regarding FIG. 4, changing the PRX_TIMER value affects the duration of the pre-transmission period permanently whereas changing the PTX only affects the during of the pre-transmission period of the current frame.

Figure 6:
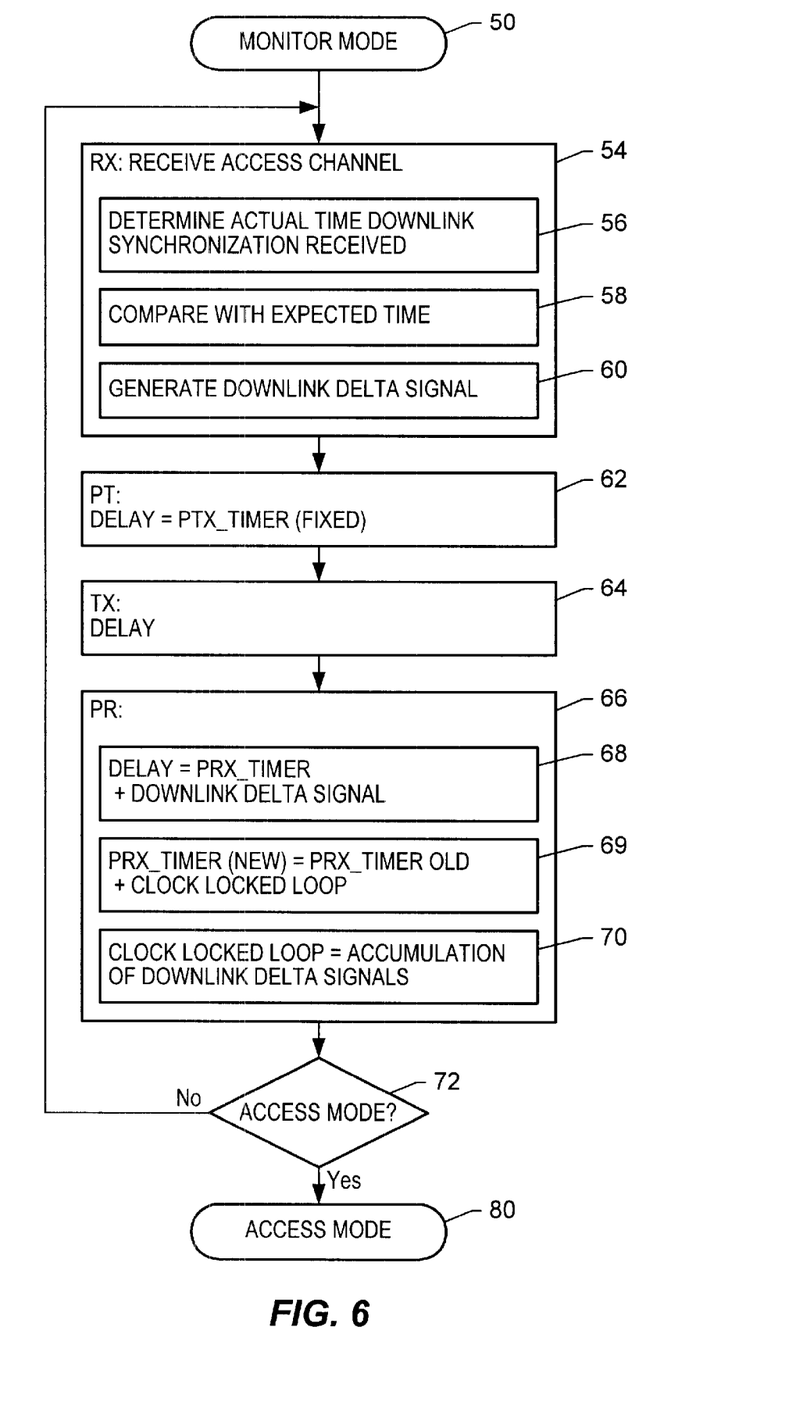
FIG. 6 is a flowchart illustrating timing adjustment operations performed by the terminal during the monitor mode in accordance with the present invention.

FIG. 6 is a flowchart illustrating timing adjustment operations performed by the terminal 14 during the monitor mode in accordance with the present invention.

During the monitor mode, the terminal 14 listens to the broadcast signals on an access channel transmitted by the base station. During the receive time, RX at step 54, the terminal monitors the access channel for a downlink synchronization signal. Step 56 determines the time of reception of the downlink synchronization signal. Step 58 compares the reception time with an expected reception time (from a prior reception of the downlink synchronization signal) and step 60 generates a downlink delta signal δt$_b$ based upon the comparison of step 58. The terminal is not transmitting in the monitor mode and the pre-transmit delay is fixed at the predetermined PTX_TIMER value, step 6S, and a corresponding delay is performed during the transmit time, TX, step 64. During the pre-receive time, PR, step 66, the time is adjusted. In step 68, the fixed PRX_TIMER value is added to the downlink delta signal value calculated at step 60. Step 69 updates the PRX_TIMER value in accordance with the clock locked loop adjustment value. Note that the downlink delta signal value and the clock locked loop adjustment value may be positive, negative or zero values. Then the clock locked loop value for the monitor mode is calculated at step 70 based upon an accumulation of downlink delta signals. The accumulation may for example include an accumulation of 256 prior downlink delta signals.

The downlink delta signals of the current and previous frames provide information of the clock offset between the terminal 14 and base station 12. An estimate of the clock offset can be calculated based on an accumulation of the downlink estimate signals. In one embodiment, the downlink delta signals are simply averaged and the averaged value is used as the difference between the pre-reception periods of the terminal 14 and the base station 12 due to the clock offset. The difference is compensated by PRX_TIMER (NEW)=PRX_TIMER(OLD)+$\delta t_b$ (AVE.), which permanently changes the pre-reception time at the terminal, which corresponds to adjusting the frequency of the clock locked loop. By means of adaptive justification, the clock difference between the terminal and the base station is gracefully eliminated. This is an open-loop form of compensating the clock locked loop. This method can also effectively track any timing jittering at the base station.

At the beginning of each frame, the terminal 14 fetches the PRX_TIMER value from the PRX timing register and assigns it to PRX and starts the countdown of the pre-reception period. The terminal 14 receives downlink synchronization signals from the base station 12 during the PR and RX periods. The starting point of RX, or the duration of PR, determines the reception timing at the terminal. The terminal 14 first obtains a downlink delta signal value, $\delta t_b$, based on the received downlink synchronization signals. The downlink delta signal value is then incorporated into the PR period and thus adjusts the reception timing. This particular operation can be described mathematically as PRX=PRX+$\delta t_b$. This process repeats in every subsequent frame.

Figure 7:
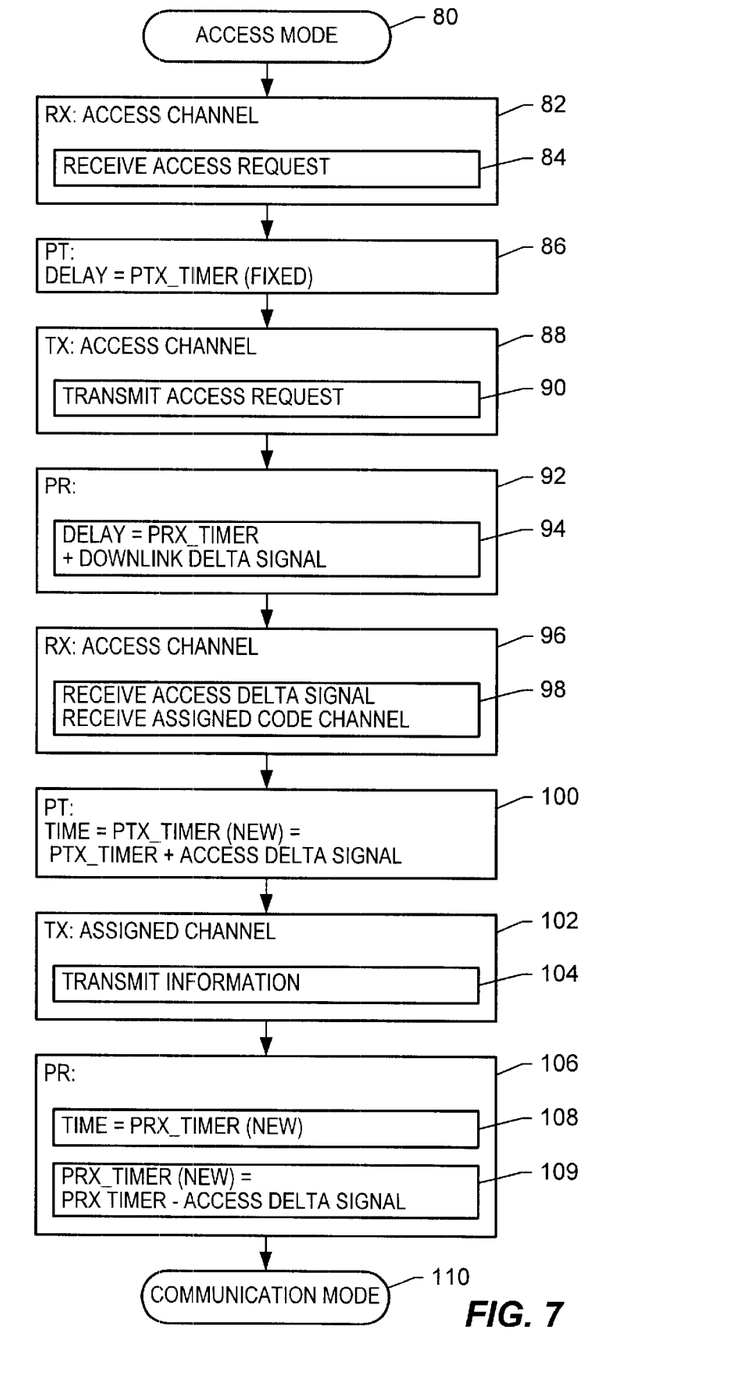
FIG. 7 is a flowchart illustrating the disclosed timing estimation and adjustment operations performed by the terminal during the access mode in accordance with the present invention.

FIG. 7 is a flowchart illustrating the disclosed timing estimation and adjustment operations performed by the terminal 14 during the access mode in accordance with the present invention.

During the access mode, a terminal may receive an access request from the base station in response to a call for the terminal, steps 82 and 84. Then the pre-transmit time is set to PTX_TIMER and executed at step 88. The signal of step 84 or a signal from a user desiring to initiate a call from the terminal causes a transmit request signal to be transmitted by the terminal during the transmit time TX on the access channel, at steps 88 and 90. Then, the pre-receive time is set at step 96 and 94 similar to the times of steps 66 and 68. Then at stop 96 the access channel is again received during the receive time, RX. An access delta signal is received and is used by the terminal to adjust the time of its PTX_TIMER and PRX_TIMER values. The access delta signal is generated by the base station to set the arrival time of future transmissions from the terminal. The base station compares the actual arrival time of the transmission of step 90 with a desired arrival time. The base station sets the arrival time such that all transmissions from all terminals are synchronized. Preferably in a synchronous code division multiple access system, transmissions from the terminals arrive at the base station at the substantially the same time. At stop 98, a signal granting the terminal a code channel on which to communicate information is also received. Then at step 100, the pre-transmission time is adjusted to the new PTX_TIMER equal to the current PTX_TIMER value plus the value of the access delta signal received at step 98. Information is transmitted to the base station on the assigned channel during the transmit time TX, step 104. Finally at step 106, the pre-receive time, PR, is adjusted to be the new PRX_TIMER. Step 109 shows that the new PRX_TIMER equals the current PRX_TIMER value minus the access delta signal value. Thereafter the communication mode is entered at step 110.

Since the clock difference between the terminal 14 and the base station has already been compensated during the monitor mode, the access delta signal is primarily a result of the propagation delay between the base and the terminal. According to the preferred embodiment of the invention, the terminal 14 adjusts the PTX_TIMER by adding the access delta signal obtained in step 98, and adjusts the PRX_TIMER with a complementary value by subtracting the access delta signal value. Consequently, the starting time of the reception remains unchanged.

In the access mode, the terminal 14 adjusts TDD frames based on the downlink delta signal values. After the terminal 14 initiates the access by transmitting an access request signal to the base station 12, the base station responds with an acknowledgment message, in which the access delta signal, $\delta t_f$, is sent back. The terminal 14 adjusts its pre-transmission period or the current value in the PTX counter, PTX=PTX+$\delta t_f$, to compensate this delay. However, the timing of reception should remain unchanged, the pre-reception period thus needs to be adjusted by the same amount towards the opposite direction, i.e., PRX=PRX−$\delta t_f$. As pointed out earlier, forward delay is primarily due to the propagation delay, hence the above changes should be in effect for all subsequent frames. Accordingly, PTX_TIMER (NEW) =PTX_TIMER(OLD)+$\delta t_f$, and PRX_TIMER (NEW) PRX_TIMER(OLD)−$\delta t_f$.

Although the timing adjustment in the access mode is shown to be accomplished in one frame, the access process may last over a plurality of frames wherein the terminal simply repeats the timing adjustment based on the principle described above.

Figure 8:
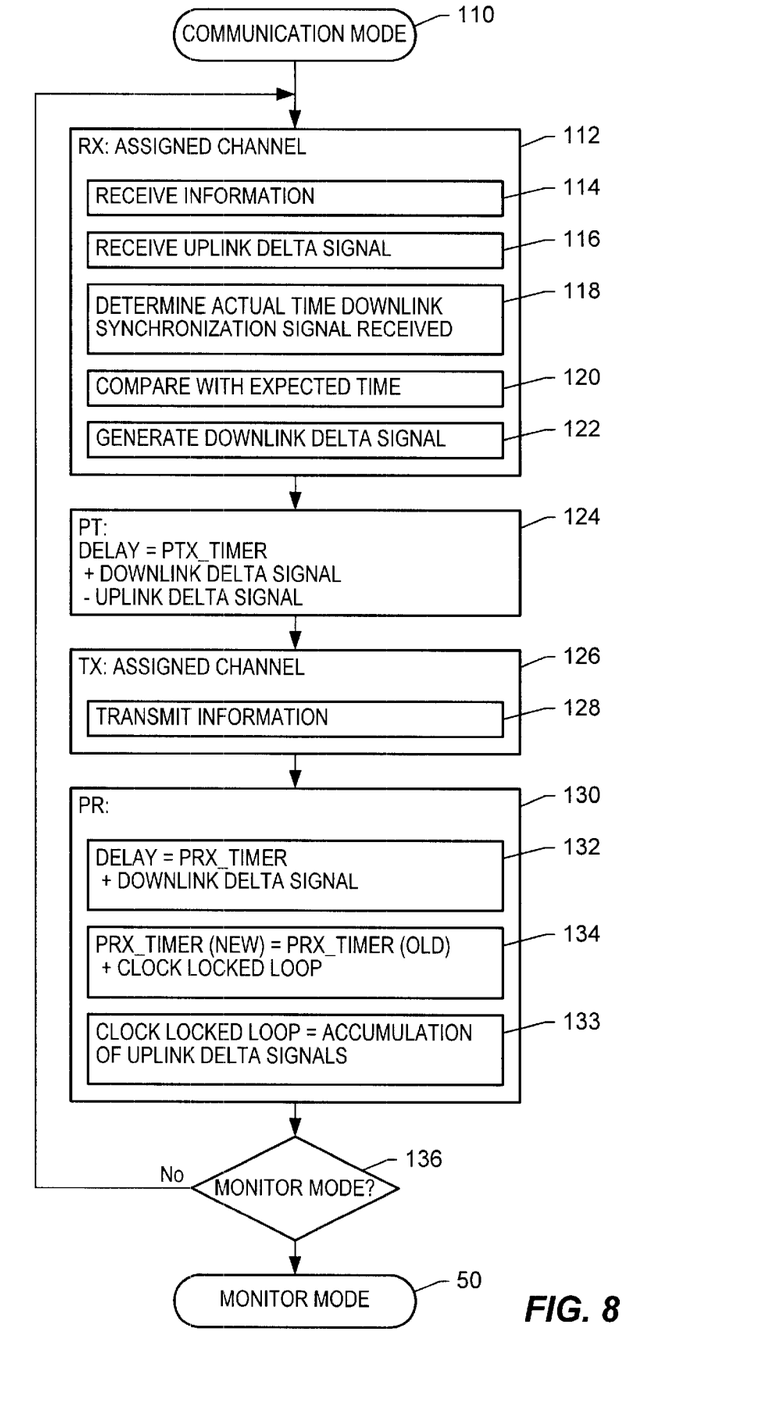
FIG. 8 is a flowchart illustrating the disclosed timing estimation and adjustment operations performed by the terminal 14 during the communication mode in accordance with the present invention.

FIG. 8 is a flowchart illustrating the disclosed timing estimation and adjustment operations performed by the terminal 14 during the communication mode in accordance with the present invention.

The communication mode starts after a successful access of the terminal 14. Once entering the communication mode at step 110, the base station 12 takes over the control of the transmission timing of the terminal 14 through closed loop feedback. More specifically, at step 112 during receive time RX, the base station sends communication information on the assigned channel, step 114 and an uplink delta signal 116 in its message signals to the terminal. As in the monitor mode, the terminal continues the open loop process of generation of the downlink delta signal by comparing expected and actual arrival times of the down link synchronization signal, steps 118, 120 and 122. Then in step 124 the pre-transmit time is adjusted to be the PTX_TIMER value, set from step 100, plus the uplink delta signal received from the base station at step 116, minus a downlink delta signal used in a prior execution of step 132. Note that the initial value of the downlink delta signal may be zero. Thereafter, information is transmitted on the assigned channel in the transmit time TX, steps 126 and 128. Then the pre-receive time, PR, is calculated at step 130 as the PTX_TIME plus the downlink delta signal value. In step 133 the PRX_TIMER value is adjusted in response to the clock locked loop. The clock locked loop frequency is adjusted based upon an accumulation of uplink delta signals at step 134. If the communication is ended, step 136 returns to the monitor mode, step 50.

Unlike the access mode, in which the PRX_TIMER and PTX_TIMER are adjusted based on the propagation delay using the access delta value, the uplink delta value only affects the current pre-transmission time. This is because the propagation delay has already been compensated by the access delta signal, The uplink delta signals here are mainly attributed to the remaining clock offset or new clock jitter. Therefore, the uplink delta signals obtained from a plurality of frames are accumulated here to adjust the clock locked loop in a similar fashion described above in the monitor mode.

During the communication mode, the reception timing is controlled in an open loop process by the terminal based on the downlink delta signal, as in the monitor mode. The difference however, is that the downlink delta signal not only affects the pre-reception counter of the current frame, PRX, but also adjust the PRX_TIMER and the PTX_TIMER for subsequent frames. The rational here is that after the clock offset is compensated, the retaining downlink delta signals are due to the change of distance between the terminal and the base station, thus requires tile adjustment of both the pre-reception period and pre-transmission period.

The above operations preferably repeats in every TDD frame, Therefore, even in a time-varying environment, uplink and downlink timing are adjusted adaptively to assure the communication performance. Also, as noted above, the downlink delta signal value is used to compensate for the downlink propagation delay, thus enabling the feedback signals provided from the base station to be used primarily for conveying information on the clock difference between the base station 12 and the terminal 14.

After a successful access, the terminal 14 enters the communication mode where message signals are exchanged between the terminal 14 and the base station 12 regularly. During the communication mode, the transmission timing of the terminal 14 is controlled completely by the base station through closed loop feedback. Once a nonzero uplink delta signal value, $\delta t_p$, is extracted from the downlink information, the terminal 14 adjusts the current value of the PTX counter to PTX=PTX−$\delta t_p$. Contrasting to the access mode however, the terminal 14 does not change the PTX_TIMER value in the PTX timing register, which will affect all subsequent frames. This is because after the access process, the delay here is primarily due the timing drifting of the clock rather than the change of propagation delay.

Thus according to the present invention, the delay estimates during the communication mode contain information of the clock offset, and is utilized for clock adjustment in a similar fashion as in the monitor mode. In one embodiment, this is accomplished by obtaining an average of the uplink delta signal values from a plurality of frames. The average value is then subtracted from PRX_TIMER, i.e., PRX_TIMER(NEW)=PRX_TIMER (OLD)−$\delta t_p$(AVE.), to reduce the difference in frame size between the terminal and the base station. In another embodiment, the downlink delta signal in each frame is applied to a local digital clock-locked-loop (CLL) to gracefully tune the PRX_TIMER and gradually eliminate the clock difference. A variety of other techniques known in the art can be employed.

The reception timing during the communication mode is fully controlled by the terminal as usual in an open loop fashion. Every time a downlink delta value is determined, the terminal 14 adjusts the pre-reception period in the current frame: PRX=PRX+$\delta t_b$. It is important to point out however, the transmission timing should remain unaffected unless a nonzero uplink delta signal is sent by the base station. Therefore in accordance with the present invention, the current value of the pre-transmission counters PTX, is also adjusted to PTX=PTX−$\delta t_b$ to keep the transmission timing.

As pointed out, the uplink delta signals are used to compensate the clock offset between the terminal 14 and the base station 12. The remaining timing ambiguity that causes a downlink delta signal contains information of the change of distance. Hence when the downlink delta signal is a nonzero value, the pre-reception and pre-transmission periods should be adjusted permanently according to the present invention. More specifically, PRX_TIMER(NEW)=PRX_TIMER(OLD)−$\delta t_b$, while PTX_TIMER(NEW)=PTX_TIMER(OLD)+$\delta t_b$.

It should be further noted that the frequency of the clock locked loop is adjusted based upon two different signals. In the monitor mode the clock locked loop adjustment value is determined by monitoring the arrival time of synchronization signals, while in the communication mode, the clock locked loop is adjusted in response to uplink delta signal values from the base stations The base station in the preferred embodiment has significantly more processing power and a higher sampling rate than that available in the low cost remote terminal. Consequently, signals indicative of the frequency offset of the remote terminal are more accurate when generated by the base station than when determined by the remote terminal. The uplink delta signals provide a much finer resolution value when generated by the base station and thus improves tho adjustment of the clock locked loop. In the monitor mode, the uplink delta signal is not available and the clock locked loop is adjusted based upon determinations made entirely within the remote terminal.

It will be apparent to those skilled in the art that various modifications can be made to the antenna array CDMA communications system and method of the instant invention without departing from the scope or spirit of the invention, and it is intended that the present invention cover modifications and variations of the antenna array communications system and method provided they come in the scope of the appended claims and their equivalents.

We claim:

1. A method of adjusting a frequency of a clock locked loop in a remote terminal for timing reception of communication signals including downlink synchronization signals and uplink delta signals from a base station comprising the steps of:

adjusting the frequency of the clock locked loop in response to a timing of reception of downlink synchronization signals while the remote terminal is operating in a receive only base station monitor mode; and adjusting the frequency of the clock locked loop in response to uplink delta signals received by the remote terminal while the remote terminal is operating in a receive and transmit base station communication mode.

2. The method according to claim 1 wherein a multiplicity of downlink synchronization signals are transmitted with a predetermined periodicity, and said step of adjusting the frequency of the clock locked loop in response to the timing of reception of downlink synchronization signals further comprises the steps of:

establishing an expect reception time for each downlink synchronization signal in response to a reception time of a prior downlink synchronization signal and further in response to the frequency of the clock locked loop;

comparing an actual reception time of each downlink synchronization signal with the expected reception time and producing a downlink delta signal; and adjusting the frequency of the clock locked loop in response to an accumulation of downlink delta signals, and further wherein said step of adjusting the frequency of the clock locked loop in response to values of uplink shift signals further comprises the step of adjusting the frequency of the local clock in response to an accumulation of values of uplink shift signals.

3. The method according to claim 1 further comprising the steps of:
   adjusting a reception time of a first periodic downlink information frame in response to the downlink synchronization signals and the frequency of the clock locked loop while the remote terminal is operating in the monitoring mode; and
   adjusting a reception time of a second periodic downlink information frame including the uplink delta signal in response to the downlink synchronization signal and the frequency of the clock locked loop while the remote terminal is operating in the communication mode.

4. The method according to claim 3 wherein the first and second information frames are respectively modulated upon first and second code channels carried upon a common carrier frequency within a periodic downlink time slot.

5. The method according to claim 1 further comprising the step of
   adjusting a transmission time of an uplink information frame transmitted by the remote terminal in response to the uplink delta signal while the remote terminal is operating in the communication mode.

6. A method of adjusting a frequency of a clock locked loop in a remote terminal for timing reception of communication signals including downlink synchronization signals and uplink delta signals from a base station comprising the steps of:
   adjusting the frequency of the clock locked loop in response to a timing of reception of downlink synchronization signals while the remote terminal is operating in a receive only base station monitor mode;
   adjusting the frequency of the clock locked loop in response to uplink delta signals received by the remote terminal while the remote terminal is operating in a receive and transmit base station communication mode; and
   adjusting a transmission time of an uplink information frame transmitted by the remote terminal in response to the uplink delta signal while the remote terminal is operating in the communication mode;
   wherein said adjusting the transmission time further includes establishing the transmission time of the uplink information frame in response to an initial access delta signal received in a first information frame while the remote terminal is operating in a receive and transmit access mode, wherein the frequency of the clock locked loop is not adjusted in response to the access delta signal.

7. The method according to claim 6 wherein the access delta signal and uplink delta signal are respectively modulated upon first and second code channels carried upon a common carrier frequency within a periodic downlink time slot, and the uplink information frame in is modulated upon the second code channel on the common carrier frequency within a periodic uplink time slot.

8. A method of adjusting receive and transmit timing in a remote terminal operating in a communication mode for receiving information from a base station and transmitting information to the base station, the information modulated upon a common radio frequency carrier in a time division duplex communication system having repeating periodic time slots including a pre-receive time slot of adjustable duration, a receive time slot of predetermined duration, a pre-transmit time slot of adjustable duration, and a transmit time slot of predetermined duration, the method comprising the steps of:
   (a) receiving information including an uplink delta signal from the base station during the receive time slot;
   (b) adjusting the duration of the pre-transmit time slot in response to the uplink delta signal;
   (c) transmitting information during the transmit time;
   (d) adjusting a frequency of a clock locked loop in response to an accumulation of prior received uplink delta signals; and
   (e) adjusting the duration of the pre-receive time slot in response to the frequency of the clock locked loop.

9. The method according to claim 8 wherein
   said step (a) of receiving further receives a downlink synchronization signal occurring at a predetermined time and further comprises the step of comparing an actual time of reception of the downlink synchronization signal with an expected time of reception to produce a downlink delta signal and wherein
   said step (e) of adjusting further adjusts the duration of the pre-receive time slot in response to the downlink delta signal, and the method further comprises the steps of:
      (f) receiving information including a subsequent uplink delta signal from the base station during a subsequent receive time slot; and
      (g) adjusting the duration of a subsequent pre-transmit time slot in response to the subsequent uplink delta signal and the complement of the delta downlink signal.

10. The method according to claim 9 wherein the communication system is a synchronous code division multiple access communication and the base station is in communication with a plurality of remote terminals including the remote terminal and the base station adjusts the value of the uplink delta signal received in said step (a) of receiving in order to synchronize an arrival time of information of said step (c) of transmitting to be in coincidence with arrival times of information transmissions of the remaining plurality of remote terminals.

11. A method according to claim 8 wherein the remote terminal further operates in a monitor mode for receiving information from a base station but not transmitting information to the base station, wherein in the monitor mode
   said step (a) of receiving information does not including receiving the uplink delta signal form the base station;
   said step (b) adjusting does not adjust the duration of the pre-transmit time slot in response to the uplink delta signal;
   said step (c) transmitting does not transmit information during the transmit time;
   said step (d) of adjusting adjusts the frequency of a clock locked loop in response to an accumulation of the downlink delta signals;
   said step (f) of receiving does not receive the subsequent uplink delta signal from the base station during the subsequent receive time slot; and
   said step (g) of adjusting adjusts the duration of a subsequent pre-transmit time slot does not adjust the duration of the pre-transmit time slot in response to either the uplink delta signal or the subsequent uplink delta signal.

12. The method according to claim 11 wherein the communication system is a code division multiple access communication system and the remote further switches from the monitor mode to the communication mode and traverses an access mode wherein during the access mode,
   said step (a) of receiving information including an access delta signal from the base station during the receive time slot on a first code channel;

said step (c) transmitting transmits information during the transmit time on a second code channel; and said step (d) of adjusting adjusts the frequency of a clock locked loop in response to the accumulation of the downlink delta signals.

13. A method for synchronization at a mobile unit in a time-division-duplex (TDD) wireless communication system, wherein digital signals communicated between the mobile unit and a fixed station are received and transmitted in TDD frames, wherein each of said TDD frames is comprised of a pre-reception period with duration $T_{PR}$, a reception period with duration $T_R$, a pre-transmission period with duration $T_{PT}$, and a transmission period with duration $T_T$, wherein timing at the mobile unit is provided by a system clock, the method comprising the steps of:

a) receiving downlink data signals including downlink synchronization signals at the mobile unit;
  b) determining a downlink delta signal, $\delta t_b$, from said downlink synchronization signals, wherein said downlink delta signal is caused by a propagation delay;
  c) adjusting said pre-reception period based on said downlink delta signal, wherein said adjusting adjusts a beginning of said reception period;
  d) demodulating downlink message data from said downlink data signals received during said reception period, wherein said downlink data signals include an uplink delta signal, $\delta t_f$, transmitted by said fixed station, wherein said uplink delta signal $\delta t_f$ is provided from the fixed station based on uplink signals previously transmitted by the mobile unit to the fixed station, wherein said uplink delta signal $\delta t_f$ represents a clock difference between the mobile unit and the fixed station;
  e) adjusting said pre-transmission period based on said downlink delta signal and said uplink delta signal, wherein said adjusting said pre-transmission period adjusts a start of said transmission period; and
  f) transmitting uplink signals to the fixed station during said transmission period.

14. A method according to claim 13, further comprising the step of adjusting said system clock of said mobile unit based on said uplink delta signal provided from said fixed station.

15. A method according to claim 13, further comprising the step of repeating said step (a) of receiving downlink signals at the mobile unit,
  said step (b) of determining a downlink delta signal,
  said step (c) of adjusting said pre-reception period,
  said step (d) of demodulating backward message data from said backward signals received during said reception period,
  said step (e) of adjusting said pre-transmission period, and
  said step (f) of transmitting uplink information signals to the fixed station for a plurality of TDD frames.

16. A method according to claim 13, wherein said downlink delta signal is determined in a current frame, the method further comprises the steps of:

setting a new pre-reception period and a new pre-transmission period in a subsequent frame based on said downlink delta signal; and repeating said steps (a)–(f) for a plurality of subsequent frames and repeating said setting said new pre-reception period and said new pre-transmission period for said plurality of subsequent frames.

17. A method according to claim 13, wherein said steps (a) through (f) are performed for a current frame, wherein said step (c) of adjusting said pre-reception period comprises the step of if $\delta t_b \neq 0$, then setting the pre-reception period in the current TDD frame as $T_{PR} + \delta t^b$, and wherein said step (e) of adjusting said pre-transmission period comprises:

if $\delta t_b \neq 0$, setting the pre-transmission period in the current TDD frame as $T_{PT} - 2\delta t_b$;

for subsequent TDD frames, updating said pre-reception period and said pre-transmission period as $T_{PR}(new) = T_{PR} + 2\delta t_b$, $T_{PT}(new) = T_{PT} - 2\delta t_b$, wherein $T_{PR}(new)$ and $T_{PT}(new)$ are used as a default pre-reception period and default pre-transmission period in subsequent frames;

wherein, for said subsequent frames, said adjusting said pre-reception period comprises adjusting said default pre-reception period $T_{PR}(new)$ based on a new downlink delta signal;

wherein, for said subsequent frames, said adjusting said pre-transmission period comprises adjusting said default pre-transmission period $T_{PT}(new)$ based on the new downlink delta signal and a new uplink delta signal.

18. A method according to claim 13 further comprising the step of adjusting a system clock by obtaining an expected clock offset estimate from a plurality of uplink delta signals fed back from said fixed station over a predetermined time period, and adjusting said system clock based on said expected clock offset.

19. A method according to claim 18 wherein said step of obtaining an expected clock offset estimate comprises the steps of:

cumulating a plurality of uplink delta signals fed back from said fixed station over a predetermined time period to produce a cumulated delay estimate; and normalizing said cumulated delay estimate with respect to said predetermined time period to produce an expected clock offset for one TDD frame.

20. A method according to claim 18 wherein said step of adjusting said system clock comprises the steps of"

applying said uplink delta signal to a local clock-lock-loop (CLL) as an error input, adjusting said clock adaptively using said local clock-lock-loop.

* * * * *

UNITED STATES PATENT AND TRADEMARK OFFICE
CERTIFICATE OF CORRECTION

PATENT NO. : 6,470,057 B1
DATED : October 22, 2002
INVENTOR(S) : Hui et al.

It is certified that error appears in the above-identified patent and that said Letters Patent is hereby corrected as shown below:

<u>Column 14,</u>
Line 15, please delete "$\delta t^b$" and substitute -- $\delta t_b$ --.

Signed and Sealed this

Twenty-first Day of January, 2003

JAMES E. ROGAN
*Director of the United States Patent and Trademark Office*